United States Patent [19]

Verrier et al.

[11] Patent Number: 5,239,664
[45] Date of Patent: Aug. 24, 1993

[54] ARRANGEMENT FOR PROTECTING AN ELECTRONIC CARD AND ITS USE FOR PROTECTING A TERMINAL FOR READING MAGNETIC AND/OR MICROPROCESSOR CARDS

[75] Inventors: Philippe Verrier, Le Port Marly; Roger Poulenard, Le Peco, both of France

[73] Assignee: Bull S.A., Paris, France

[21] Appl. No.: 952,159

[22] Filed: Sep. 28, 1992

Related U.S. Application Data

[63] Continuation of Ser. No. 452,128, Dec. 18, 1989, abandoned.

[30] Foreign Application Priority Data

Dec. 20, 1988 [FR] France .................. 88 16787

[51] Int. Cl.⁵ .................. G06F 1/26; G06F 12/14
[52] U.S. Cl. .................. 395/800; 364/273.1;
364/246.6; 364/918.7; 364/969; 364/DIG. 1;
364/DIG. 2; 380/4
[58] Field of Search .................. 395/DIG. 1, DIG. 2,
395/425, 575, 600, 800; 380/3, 4, 52, 25, 59, 5,
53; 365/52, 228, 218; 364/184; 340/652, 562,
567, 561; 235/380, 487, 488, 492, 439, 440, 441,
442, 443, 444, 445, 446, 447, 448

[56] References Cited

U.S. PATENT DOCUMENTS

| | | | |
|---|---|---|---|
| 4,360,727 | 11/1982 | Lehmann | 235/441 |
| 4,523,297 | 6/1985 | Ugon et al. | 364/DIG. 1 |
| 4,593,384 | 6/1986 | Kleijne | 365/228 |
| 4,691,350 | 9/1987 | Kleijne et al. | 380/3 |
| 4,783,801 | 11/1988 | Kaule | 380/3 |
| 4,811,288 | 3/1989 | Kleijne et al. | 365/52 |
| 4,849,927 | 7/1989 | Vos | 364/DIG. 1 |

FOREIGN PATENT DOCUMENTS

| | | |
|---|---|---|
| 2352136 | 4/1975 | European Pat. Off. |
| 0128672 | 12/1984 | European Pat. Off. |
| 2580834 | 4/1985 | France |
| 2596176 | 3/1986 | France |

Primary Examiner—Robert B. Harrell
Attorney, Agent, or Firm—Kerkam, Stowell, Kondracki & Clarke

[57] ABSTRACT

The present invention relates to an arrangement for protecting an electronic card and to its use for protecting a terminal for reading a magnetic card and/or a microprocessor card. An arrangement for protecting a card including, on a printed circuit, an electronic circuit with volatile memory (12) containing programs or information to be protected, characterized in that it includes a resistive network (21, 22) surrounding the circuit (1) embedded in the resin (3), the resistive network (21, 22) being incorporated in an electronic circuit (10) for detecting modifications to the resistance of the network, to bring about a destruction of the information of the volatile memories (12).

21 Claims, 3 Drawing Sheets

ARRANGEMENT FOR PROTECTING AN ELECTRONIC CARD AND ITS USE FOR PROTECTING A TERMINAL FOR READING MAGNETIC AND/OR MICROPROCESSOR CARDS

This is a continuation of application Ser. No. 07/452,128, filed Dec. 18, 1989, now abandoned.

FIELD OF THE INVENTION

The present invention relates to an arrangement for protecting an electronic card and to its use for protecting a terminal for reading a magnetic and/or microprocessor card.

BACKGROUND OF THE INVENTION

In an electronic card that, on a printed circuit, includes both a microprocessor and memories meant to contain confidential information that is not to be accessible to a defrauder, access to these memories must be protected by physical means. Such access protection by physical means can be circumvented, however, by means that destroy the protection without damaging the memories or their contents. This means that the use of these destructive means must be prevented as completely as possible. Likewise, if the ambient temperature has been lowered far enough before a memory is disconnected from its power supply system, the memory will save the contents even after the power cutoff.

SUMMARY OF THE INVENTION

Hence a first object of the invention is to propose an arrangement for physical protection of an electronic card with a volatile memory.

This object is attained in that the arrangement includes a resistive network surrounding the circuit embedded in the resin, the resistive network being incorporated in an electronic circuit for detection of modifications to the resistance of the network, in order to bring about the destruction of the information in the volatile memories.

In another characteristic, the circuit for detection of modifications to the resistance of the network comprises a resistor bridge connected to the terminals of a comparator. The other object of the invention is to propose a protection arrangement with which attempts to destroy the physical protection or to save the information contained in the memory by lowering the temperature can be detected.

This object is attained in that it includes temperature detection associated with the electronic circuit and the destruction of the information in the volatile memory when a low temperature threshold, or a high temperature threshold, is crossed.

In another feature, the temperature detection means comprise a thermistor mounted in a resistor bridge, connected to the terminals of a window comparator.

A third object is to propose an arrangement making it possible to detect the opening of the package, to warn of a physical attack.

This third object is attained by providing for detection of the opening of the package, to cause the destruction of the information of the nonvolatile memory.

In another characteristic, the opening detection comprises a switch with a flexible blade fixed on one half of the package and controlled by a magnet mounted adjacently on the other half of the package.

In another characteristic, the output corresponding to temperature detection, of the circuit for detecting modifications to the resistance of the network and opening of the package are sent via an AND gate to a multivibrator, the output of which controls an electronic switch that interrupts the power to the volatile memories.

Another object of the invention is to use the above arrangement to protect the electronics of a terminal for magnetic and/or microprocessor cards.

This object is attained in that the terminal includes a visual display device, a magnetic track reader and/or a microprocessor circuit reader, a keyboard and at least one communications connection to either another piece of equipment or a network.

Further characteristics and advantages of the present invention will become more apparent from reading the ensuing detailed description, taken in conjunction with the accompanying drawings.

DESCRIPTION OF THE PREFERRED EMBODIMENT

Figure 1:
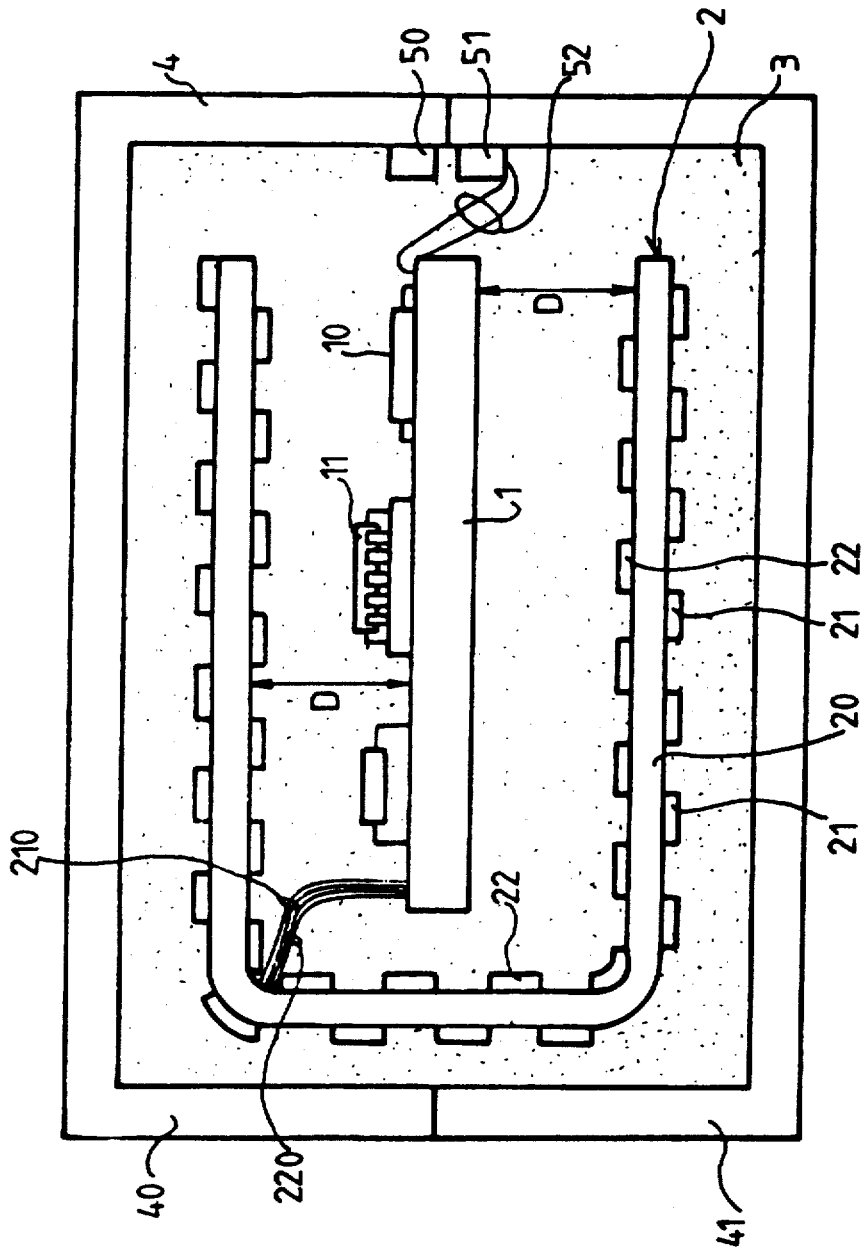
FIG. 1 is a schematic sectional view of the arrangement for physical protection of an electronic card.

A card 1 including a set of electronic circuits 10, 11 is surrounded by a resistor network 2 comprising a polycarbonate film 20; a carbon film 21, 22 is printed on each of its faces by screenprinting. As can be seen from FIG. 1, the carbon tracks 22 on one face of the polycarbonate film are staggered with respect to the tracks 21 of the other face of the substrate film 20.

The set of these carbon film networks 22 and 21 deposited on each of the faces comprise a first resistor R1 and a second resistor R2, respectively, which are connected to the electronic circuit of the card 1 by a first and second linkage 220 and 210, respectively. The set comprising the electronic card 1 and resistor network 2 is embedded in the polyurethane resin. This resin remains in the solid state up to a temperature of approximately 100° C. The distance D between the faces of the resistor network and the printed circuit comprising the electronic card is reduced to a sufficient extent to preclude sliding of a probe of a measuring instrument between the resistor network 2 and the electronic circuit card 1 via the faces where, because of the U cross section of the resistor network 2, the card is not surrounded.

In an improved embodiment, it would be conceivable to surround the card with four resistor networks disposed in such a way that no open interval whatever allows access to the electronic card 1.

The resin block 3 is then enclosed in a package 4 comprise two half shells 40, 41; a first half includes a magnet 50 in proximity with the separation surface, and the second half 41, adjacent to the separation surface, includes a switch 51 with a flexible blade, which is connected by wires 52 to the electronic circuit of the card 1.

Figure 2:
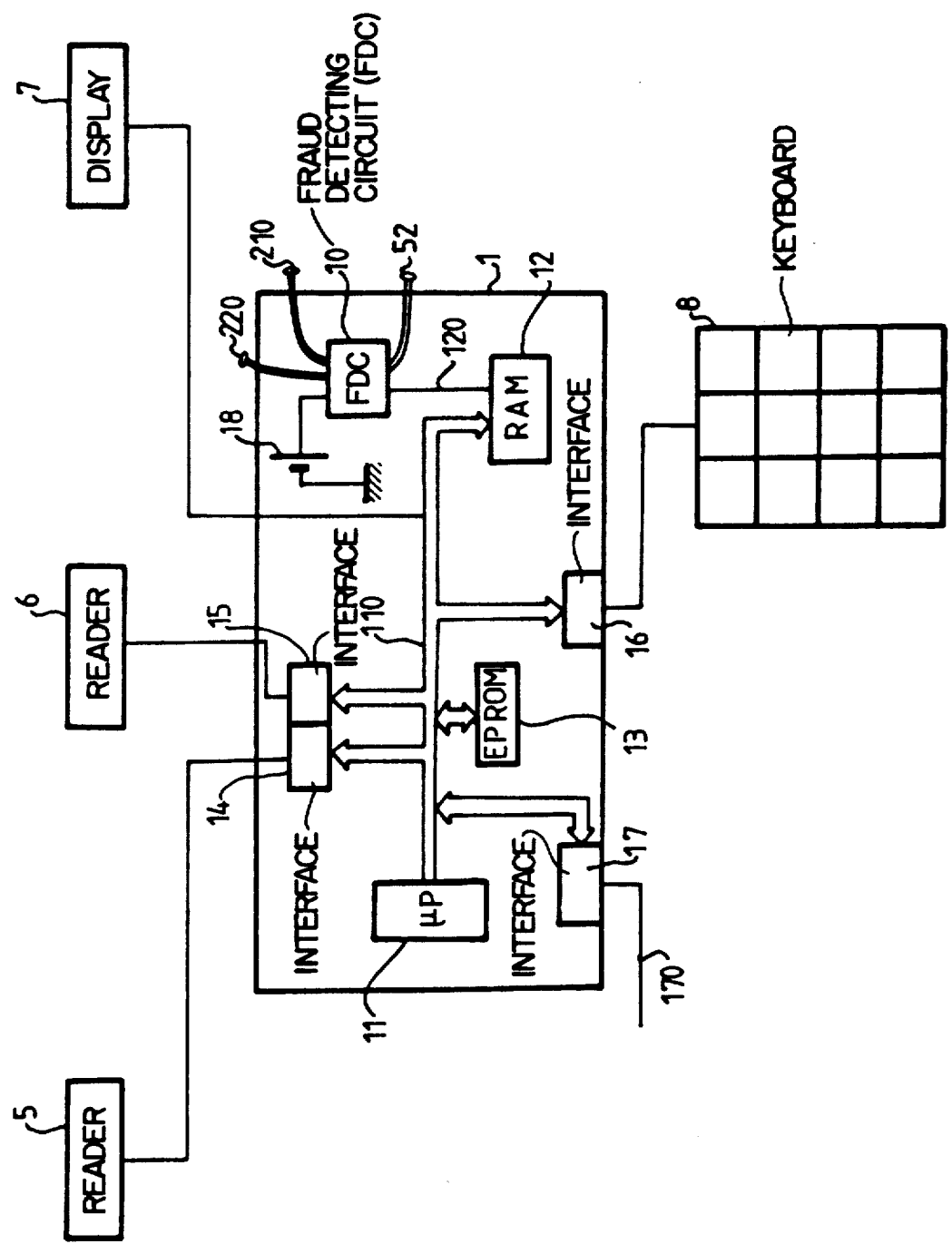
FIG. 2 is a diagram showing the functional elements of the terminal.

FIG. 2 shows a practical application of the principle of the invention according to FIG. 1, particularly for protecting a credit card reading terminal. This credit card reading terminal shown in FIG. 2 includes a magnetic track reader 6 connected via an interface circuit 15 to a bus 110, to which a microprocessor 11 is connected. A second reader 5 is adapted for reading credit cards, including, in addition to the magnetic track, a circuit that is integrated with an autoprogrammable microprocessor. This reader 5 is connected by a second interface 14 to the bus 110. A display device 7, for example comprising light emitting diodes, is also connected to the bus 110. A volatile memory 12 is also connected to the bus 110. This volatile memory 12 (or RAM) is transformed into a nonvolatile memory by a battery 18 or a lithium cell, which makes it possible to assure the power supply to the volatile memory even in the case where a main or auxiliary power system is cut off. This power supply 18 to the volatile memory is transmitted via an electronic circuit 10 for detecting attempts at fraud, and the electronic circuit 10 is connected by the wires 220, 210 and 52 both to the resistors of FIG. 1 and to the flexible blade switch 51. Similarly, a keyboard 8 is connected to the bus 10, by way of an interface circuit 16. Finally, a programmable read-only memory of the EPROM type is connected to the bus 110. The terminal also includes an interface circuit 17 enabling the establishment of either a linkage of the RS 232 type or a local area network.

Figure 3:
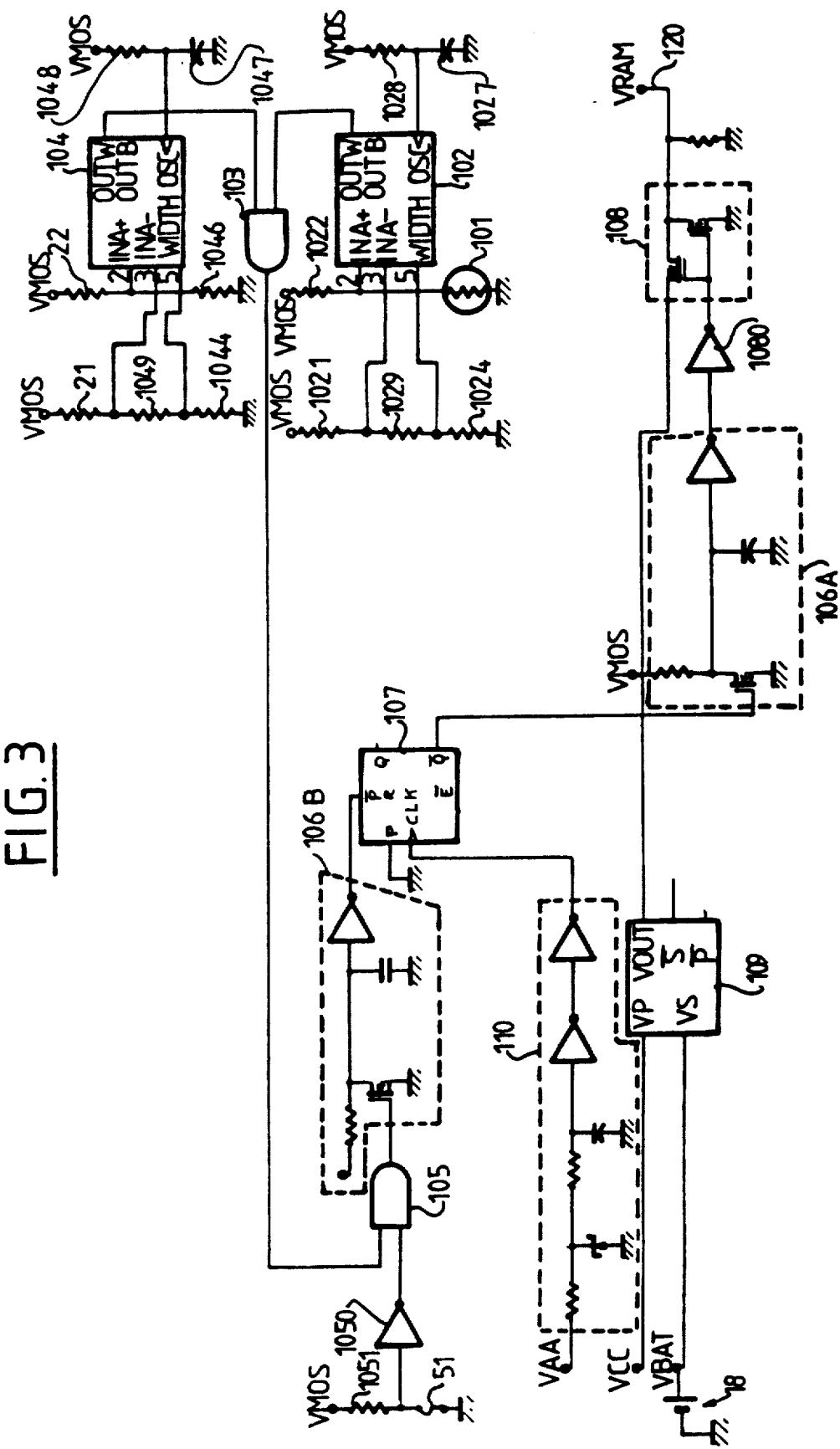
FIG. 3 is the electronic diagram for the arrangement for protecting an electronic circuit for volatile memory.

The electronic circuit 10 for protecting the card 1 from fraud is shown in FIG. 3. This electronic circuit includes a thermistor 101 mounted in a bridge comprising the resistors 1022, 1021, 1024 and 1029. The bridge is connected to the input of a window comparator 102, which at its clock input OSC receives the signal furnished by a pulse generator, comprising the common point of a resistor 1028 and a capacitor 1022, which are connected in series between ground and the supply voltage. The output of the comparator 102 is sent to a first input of an AND gate 103. The second input of this AND gate 103 receives the output of a second window comparator 104, which at its pulse input receives the signal furnished by the common point of a resistor 1048 and a capacitor 1047, which are connected in series between the supply voltage and ground. This comparator 104 is connected to a resistor bridge comprising on the one hand the resistors 21, 22 of the network surrounding the circuit and on the other the resistors 1046, 1044 and 1049. The output of the AND gate 103 is sent to a first input of a second AND gate 105, a second input of which receives the output of an inverter 1050. This inverter 1050 has its input connected to the common point between a resistor 1051 and the flexible blade switch 51, which are connected in series between supply voltage and ground. The output of the AND gate 105 is sent via a filter 106b to a multivibrator 107, the clock input CLK of which receives the output of an oscillator 110. The /Q output of the multivibrator 107 is sent to a second filter 106a, the output of which is connected to an inverter 1080. The output of this inverter controls an electronic switch circuit 108 making it possible to cut the output 120 that supplies the volatile memories 12 of the card 1. The power supply for these memories is furnished by a power switching circuit 109, enabling the automatic switching of the power of the terminal to a supply system furnished by the lithium cell 18 connected to the VS input of the circuit 109.

In operation, the thermistor 101 associated with the comparator 102 makes it possible to detect the crossing of the two temperature thresholds, which are −30° C. and +100° C. The −30° C. threshold makes it possible, when the temperature of the electronic circuit is being lowered, to make it impossible to disconnect the battery without losing the information contained in the volatile memories 12. That would permit a defrauder to gain access to the information, represented by the keys of the clients who have used their cards, contained in the volatile memories 12. Likewise, the +100° C. threshold makes it possible to detect an attempt at melting the resin 3 with a view to gaining access to the information contained in the volatile memory. In both cases, where either of these temperature thresholds is crossed, the circuit cuts off the power to the volatile memory RAM and in this way causes the destruction of the information contained in it.

Similarly, any attempt at piercing the resistor network 21, 22 is revealed by the corresponding variation in the resistances of the resistors 21, 22 detected by the comparator 104, the output of which controls the cutoff of the power to the memory 12. Piercing of a channel to introduce a measurement probe, and thus sample the information contained in the memory, can be prevented in this way. Finally, the opening of the package of the terminal is detected by the flexible blade switch 51, the contact of which closes as soon as the magnet 50 is moved away from this switch. This situation is detected by the inverter 1050 and transmitted by the AND gate 105 to the multivibrator 107, the output of which controls the cutoff of power to the volatile memory 12. The multivibrator 107 enables memorization of one of the three detection states as soon as one of these three conditions appears, or as soon as two or three such states appear at the same time.

In this way, an electronic circuit protection arrangement and the use of this arrangement for protecting the information contained in a terminal adapted to function with bank cards, either with magnetic tracks or of the mixed type, or in other words with both magnetic tracks and microprocessor, or solely with a microprocessor, are achieved.

Any modification within the competence of one skilled in the art is also possible without departing from the spirit and scope of the invention.

What is claimed is:

1. An arrangement for protecting a card comprising, on a printed circuit, an electronic circuit (10) including a volatile memory (12) containing programs or information to be protected, a resistive network (21, 22) comprising carbon film tracks on opposite faces of a substrate film (20) of polycarbonate surrounding the circuit (10), the tracks on one face being staggered with respect to the tracks of the other face, said resistive network and film being embedded in a resin (3), means connecting the resistive network (21, 22) to the electronic circuit (10) for detecting modifications to resistance of the resistive network in order to bring about a destruction of information contained within the volatile memory (12) wherein the means for detecting modifications to the resistance of the resistive network comprises a circuit having a resistor bridge (21, 22, 1046, 1044, 1049), a window comparator having an output, a multivibrator having an output and an electronic switch, said resistor bridge being connected to the window comparator (104), the output of the window comparator being connected to the multivibrator (107), and the output of said multivibrator adapted to be applied to the electronic switch (108) to interrupt power to the volatile memory (12).

2. The arrangement as defined by claim 1, further including temperature detection means (101, 102, 103)

connected to the electronic circuit (10) and means (105, 107, 108) connected to said temperature detecting means for causing the destruction of the information in the volatile memory (12) when a low temperature threshold, or a high temperature threshold, is crossed.

3. The arrangement as defined by claim 2, wherein the card and resin are enclosed in a package and further including means (50, 51) connected to the means for causing destruction of information for detecting the opening of the package, to cause the destruction of the information of the volatile memory (12).

4. The arrangement as defined by claim 3, wherein the means for detecting the opening (50, 51) comprise a switch with a flexible blade fixed on one half (41) of the package and controlled by a magnet (50) mounted adjacently on the other half (40) of the package.

5. The arrangement as defined by claim 4, wherein the temperature detection means (101, 102), the means (104) of detecting modifications to the network resistance and the means (1050) for detecting the opening of the package include outputs which are sent via an AND gate (103, 105) to a multivibrator (107), having an output of which controls an electronic switch (108) that interrupts the supply to the volatile memory (12).

6. The arrangement as defined by claim 3, wherein the temperature detection means (101, 102), the means (104) for detecting modifications to the network resistance and the means (1050) for detecting the opening of the package include outputs which are sent via an AND gate (103, 105) to a multivibrator (107), having an output of which controls an electronic switch (108) that interrupts the supply to the volatile memory (12).

7. The arrangement as defined by claim 2, wherein the temperature detection means (101) comprise a thermistor (101) mounted in a resistor bridge (1022, 1021, 1024), connected to terminals of the window comparator (104).

8. The arrangement as defined by claim 7, wherein the temperature detection means (101, 102), the means (104) for detecting modifications to the network resistance and the means (1050) for detecting the opening of the package include outputs which are sent via an AND gate (103, 105) to a multivibrator (107), having an output of which controls an electronic switch (108) that interrupts the supply to the volatile memory (12).

9. The use of the arrangement defined by claim 8, characterized in that the terminal includes a visual display device (7), a magnetic track reader (6) and/or a microprocessor card reader (5), and a keyboard (8).

10. The arrangement as defined by claim 2, further including means (1050) for detecting the opening of a package and wherein the temperature detection means (101, 102), the means (104) for detecting modifications to the network resistance and the means (1050) for detecting the opening of the package include outputs which are sent via an AND gate (103, 105) to a multivibrator (107), having an output of which controls an electronic switch (108) that interrupts a supply voltage to the volatile memory (12).

11. The arrangement as defined by claim 10, wherein the resistive network (21, 22) and the substrate film (20) are in a U cross section.

12. The arrangement as defined by claim 1, wherein the card and resin are enclosed in a package and further including means (50, 51) connected to the means for causing destruction of information for detecting the opening of the package, to cause the destruction of the information of the volatile memory (12).

13. The arrangement as defined by claim 12, further including a temperature detection means and wherein the temperature detection means (101, 102), the means (104) for detecting modifications to the network resistance and the means (1050) for detecting the opening of the package include outputs which are sent via an AND gate (103, 105) to a multivibrator (107), having an output of which controls an electronic switch (108) that interrupts the supply to the volatile memory (12).

14. Use of the arrangement defined by claim 1 to protect the electronics of a terminal for magnetic and/or microprocessor cards further including a central processing unit (11) associated with the volatile memory (12).

15. The use as defined by claim 14, characterized in that the terminal includes a communication circuit (17).

16. The arrangement as defined by claim 1, wherein there are four resistive networks, each on a substrate film, disposed such that no open interval whatever allows access to the electronic circuit.

17. An arrangement for protecting a card comprising, on a printed circuit, an electronic circuit (10) including a volatile memory (12) containing programs or information to be protected, a resistive network (21, 22) on a substrate film (20) surrounding the circuit (10), said resistive network and film being embedded in a resin (3), control means connecting the resistive network (21, 22) to the electronic circuit (10) for detecting modifications of resistance of the resistive network, in order to bring about a destruction of information contained within the volatile memory (12), said control means for detecting modifications to the resistance of the resistive network including a multivibrator having an output for controlling an electronic switch connected to interrupt power to the volatile memory (12).

18. The arrangement as defined by claim 17, wherein the card and resin are enclosed in a package and further including means (50, 51) connected to the control means for detecting the opening of the package to cause the destruction of the information of the volatile memory (12).

19. The arrangement as defined by claim 17, further including temperature detection means (101, 102, 103) connected to the electronic circuit (10) and means (105, 107, 108) connected to said temperature detecting means for causing the destruction of the information in the volatile memory (12) when a low temperature threshold, or a high temperature threshold, is crossed.

20. The arrangement as defined by claim 17, wherein the resistor network is formed by a carbon film forming tracks deposited on opposite faces of a substrate film of polycarbonate and the tracks of one face being staggered with respect to the tracks of the other face.

21. The arrangement as defined by claim 17, wherein there are four resistive networks, each on a substrate film, disposed such that no open interval whatever allows access to the electronic circuit.

* * * * *